(12) United States Patent
Sauvalle et al.

(10) Patent No.: US 8,335,790 B2
(45) Date of Patent: Dec. 18, 2012

(54) METHOD AND DEVICE FOR TRANSMITTING GEOGRAPHICAL DATA ON AN AIRCRAFT

(75) Inventors: Thomas Sauvalle, Toulouse (FR); Eric Peyrucain, Saint Genies Bellevue (FR); André Bourdais, Toulouse (FR)

(73) Assignee: Airbus Operations (SAS), Toulouse (FR)

( * ) Notice: Subject to any disclaimer, the term of this patent is extended or adjusted under 35 U.S.C. 154(b) by 185 days.

(21) Appl. No.: 12/673,110

(22) PCT Filed: Aug. 4, 2008

(86) PCT No.: PCT/FR2008/001167
§ 371 (c)(1),
(2), (4) Date: Feb. 11, 2010

(87) PCT Pub. No.: WO2009/053556
PCT Pub. Date: Apr. 30, 2009

(65) Prior Publication Data
US 2012/0041951 A1    Feb. 16, 2012

(30) Foreign Application Priority Data

Aug. 20, 2007  (FR) .................................. 07 05905

(51) Int. Cl.
*G06F 7/00* (2006.01)
*G06F 17/30* (2006.01)
*G06F 12/00* (2006.01)
*G06F 15/16* (2006.01)

(52) U.S. Cl. ............................. 707/736; 707/899; 701/3

(58) Field of Classification Search .................... None
See application file for complete search history.

(56) References Cited

U.S. PATENT DOCUMENTS

| 8,032,265 B2 * | 10/2011 | He ..................................... 701/3 |
| 2004/0225420 A1 | 11/2004 | Morizet et al. |
| 2005/0187677 A1 * | 8/2005 | Walker ............................ 701/16 |
| 2007/0027589 A1 * | 2/2007 | Brinkley et al. ................... 701/3 |
| 2007/0247336 A1 | 10/2007 | Morizet et al. |
| 2008/0147315 A1 | 6/2008 | Fetzmann et al. |
| 2008/0186207 A1 | 8/2008 | Fetzmann et al. |

* cited by examiner

*Primary Examiner* — Michael Hicks
(74) *Attorney, Agent, or Firm* — Novak Druce + Quigg LLP

(57) ABSTRACT

The invention relates to a device (1) for transmitting to a user system (3) geographical data that is stored, using a unit-surface sorting, in the database (4) of a provider system (2).

10 Claims, 2 Drawing Sheets

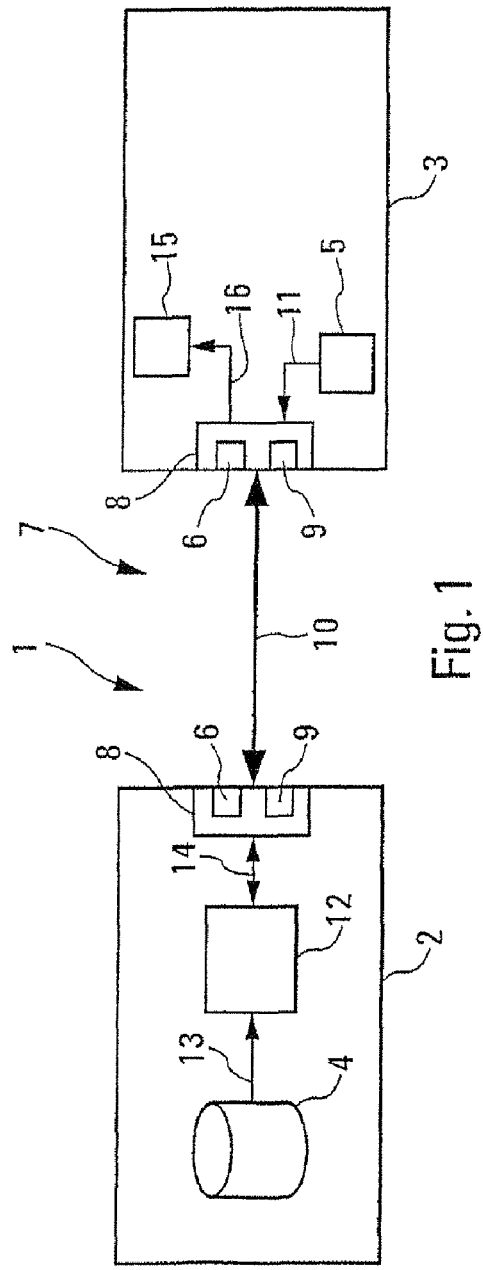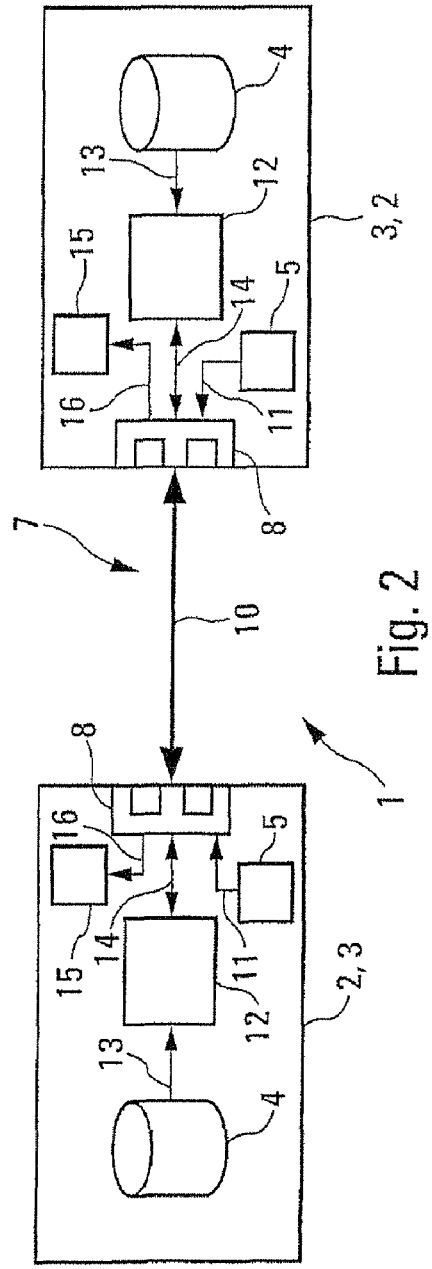

METHOD AND DEVICE FOR TRANSMITTING GEOGRAPHICAL DATA ON AN AIRCRAFT

CROSS-REFERENCE TO RELATED APPLICATIONS

This application is a §371 national stage entry of International Application No. PCT/FR2008/001167, filed Aug. 4, 2008, which claims priority to French Patent Application 0705905, filed Aug. 20, 2007, the entire contents of which are incorporated herein by reference.

FIELD OF THE INVENTION

The present invention relates to a method and a device for transmitting geographical data between at least one provider system and at least one user system that are on board an aircraft.

BACKGROUND OF THE INVENTION

It is known that an aircraft, in particular a transport airplane, comprises a number of computers that are intended to facilitate (or handle) the management of certain piloting, navigation and/or surveillance tasks, and the use, to implement at least some of their functions, geographical data. Typical of these are a flight management system of FMS (Flight Management System) type, an airport navigation system of OANS (Onboard Airport Navigation System) type, and an environment surveillance system of AESS (Aircraft Environment Surveillance System) type.

For this, these various systems each comprise or are each associated with a geographical database. Thus, a system of OANS type comprises a database containing at least airport mapping information, and a system of AESS type comprises a database containing at least information relating to the relief of the terrain. FR-2 884 020 and FR-2 883 964 disclose an airport navigation aid device.

It is known that such onboard systems, that use geographical data, such as a flight management system for example, often comprise a dedicated protocol with a proprietary format, that enables them to effectively manage the interface between the core of the system and an associated geographical database, namely a navigation database in the case of a flight management system of FMS type. This protocol is locally optimized for a system so as to minimize the response time following an external request, upon a request from a pilot via an interface of the FMS system for example.

In a standard architecture, each onboard system that uses geographical data comprises its own geographical database. Also, each system locally optimizes its use so that the aircraft includes as many different protocols. This is why, if a new system needs a first geographical datum that is contained in the database of a first system, it must subscribe to this first system and must acquire this first datum through it. This first datum therefore passes via the dedicated protocol to said first system before arriving at this new system. If this new system then needs a second geographical datum that is stored in the database of a second system, this second datum must pass via the dedicated protocol to said second system before arriving at said new system. As a result, the data pass through different protocols and different systems.

Such a standard architecture, in which a protocol is associated with each database that forms part of a system, has numerous drawbacks. In particular:

the deliveries to a user system of different geographical data can originate from different systems for one and the same geographical region. These deliveries are neither synchronized nor organized, which can provoke, for example, transient displays on a screen of the cockpit, relating to partial geographical information. As an example, the geographical data (waypoint, radio beacon, etc.) that are stored in the database of the FMS system may be displayed on a navigation screen, while the associated geographical data (terrain, obstacle, weather) that are stored in the database of the AESS system are not yet displayed;

the use of the geographical data is not optimized. The different systems comprise geographical databases that often concern all of the terrestrial globe and that therefore require memories of large size, whereas, for a given flight, the user systems of the aircraft require only a portion of these stored geographical data. Thus, the risks of corruption of the geographical data are multiplied and diversified; and the geographical data pass through different protocols, which increases the complexity of their use and reduces the possibilities of changing the use of geographical data on board the aircraft. In particular, a new user system must, generally, observe different protocols to collect the geographical data that it needs.

SUMMARY OF THE INVENTION

The present invention relates to a method of transmitting geographical data between at least one provider system and at least one user system that are on board an aircraft, this method making it possible to remedy the abovementioned drawbacks.

To this end, according to the invention, said method is noteworthy in that:

A/ in a preliminary step:
  an overall geographical area relating to all of said geographical data and corresponding to at least a part of the globe (and generally to all of the terrestrial globe) is subdivided into a plurality of unitary areas, that are separate geographical areas (that is, areas that have no common element), the combination of which covers all of said overall geographical area;
  for each of said unitary areas, the geographical data relating to a unitary area is grouped together into a plurality of different groups, each of which comprises the geographical data relating to at least one particular characteristic (waypoint, radio navigation beacon, profile of the terrain, etc.) likely to be used in a flight of the aircraft, said groups being formed such that all of said geographical data are taken into account; and
  said geographical data are stored in an ordered manner in at least one database of said provider system, by creating a classification based on unitary areas and, in each unitary area, a subclassification by groups, each group comprising the corresponding geographical data; and B/ in a subsequent step:
  a) when the user system wants to obtain particular geographical data, it sends a request via a data transmission link to said provider system, said request making it possible to identify at least one unitary area and also making it possible, for each identified unitary area, to identify at least one group;
  b) when such a request is received by said provider system, the latter searches in said database for the geographical data that are located in all of the groups identified in the request, and this is done for all of the unitary areas also identified in this request; and c) said provider system transmits said geographical information, for each identified unitary area, and for each unitary area per identified group, to said user system via said data transmission link.

Thus, thanks to the invention, the transmission of the geographical data between a provider system and a user system is handled by unitary area (or area unit) that represents a portion of the terrestrial globe. Such a transmission makes it possible to better manage the processing of geographical data by the user system, whether for the display (synchronization, partial display, etc.) or for any other use, as specified hereinbelow.

Furthermore, the method of transmitting geographical data, compliant with the invention, makes it possible to optimize the flow of onboard data exchanges, by reducing the quantity of data exchanged. In practice, the systems exchange only the unitary areas that are strictly necessary to them. This optimizes the response time that results from this exchange, the quantity of data exchanged being close to the quantity of data needed according to the size selected for each area unit. This protocol comes into its own in the case of exchanges of large volumes of data.

To handle a data transmission according to the invention, a user system requests a particular number of unitary areas and it specifies the groups (that it requests for these unitary areas). As indicated hereinabove, each group comprises the geographical data relating to at least one particular characteristic that is likely to be used in a flight, and in particular waypoints, radio navigation beacons, the profile of the terrain and/or weather information.

Furthermore, the method according to the invention offers increased capacities for change. The syntax of the language is the same for all the aircraft's geographical data user systems. Also, from the moment when a new user system observes this language, it improves the exchange of the geographical data that it needs, with the other existing systems, with little impact:

there are few or no changes to be made to the existing provider system; and there is no new protocol to be developed.

In a particular embodiment, each unitary area is a substantially rectangular area, a first side of which has a length corresponding to a predetermined latitude value, for example one degree of latitude, and of which a second side (adjacent to this first side) has a length corresponding to a predetermined longitude value, for example one degree of longitude.

Furthermore, as a variant, said overall geographical area can also be subdivided into unitary areas, according to at least one of the following sets of characteristics:

state boundaries;
time zones;
air traffic control areas.

The present invention can be applied to any type of geographical data transmission on an aircraft. Furthermore, the data transmission can be implemented in different ways.

Firstly, advantageously, the transmission of geographical data relates to a set of unitary areas making it possible to cover of corridor of predetermined width along a flight plan. This transmission may, notably, be used to provide information to a flight management system of FMS type. In this case, to optimize the data transmission, advantageously, said unitary areas are transmitted, in succession, according to their geographical position along the flight plan, in the direction corresponding to the flight of the aircraft following this flight plan.

Secondly, advantageously, the transmission of geographical data relates to an area of predetermined size that is situated around the current position of the aircraft, for example in a radius of 320 nautical miles (approximately 600 km) around the aircraft. This transmission can, in particular, be used by a surveillance system of AESS type, for which the transmitted geographical data concern only the group relating to the profile of the terrain (for the requested unitary areas).

Thirdly, advantageously, the transmission of geographical data relates to airports likely to be involved in a flight of the aircraft, in particular the departure airport, the arrival airport, and, possibly, a diversion airport. This transmission can, notably, be used by an airport navigation system of OANS type.

The present invention also relates to a device for transmitting geographical data between at least one provider system and at least one user system, that are both on board an aircraft, in particular a transport airplane.

To this end, according to the invention, said device which comprises said provider system and said user system is noteworthy in that:

said provider system comprises at least one database, in which said geographical data are stored in an ordered fashion using one classification by unitary areas and, within each unitary area, a subclassification by groups, said unitary areas being geographical areas that are separate and the combination of which covers an overall geographical area (relating to all of said geographical data and corresponding to at least a part of the terrestrial globe), each of said groups comprising the geographical data relating to at least one particular characteristic likely to be used in a flight of the aircraft, and said groups being formed such that all of said geographical data are taken into account;

said user system comprises means capable of sending a request in order to obtain geographical data, said request making it possible to identify at least one unitary area and also making it possible, for each identified unitary area, to identify at least one group (relating to a particular characteristic, as mentioned above);

said provider system also comprises:
means for searching in the database for the geographical data that are located in all of the groups identified in a received request, and do so for all of the unitary areas also identified in this request; and means for sending said geographical data, per identified unitary area, and for each unitary area, per identified group; and said device also comprises at least one data transmission link:
that is capable of transmitting a request from the user system to the provider system; and
that is capable of transmitting geographical data from the provider system to the user system.

Obviously, one and the same system of the aircraft may be, in succession, a provider system (when it provides geographical data that are stored in its database) and a user system (when it asks another system for the geographical data that it needs). However, in a preferred embodiment, said provider system is a database server, to which are connected numerous user systems of the aircraft.

The present invention also relates to an aircraft that comprises a device for transmitting geographical data, such as that mentioned above.

BRIEF DESCRIPTION OF THE DRAWINGS

The figures of the appended drawing will clearly show how the invention can be implemented. In these figures, identical references denote similar elements.

FIGS. 1 to 3 are block diagrams of different embodiments of a device for transmitting geographical data, according to the invention.

DETAILED DESCRIPTION

Figure 3:
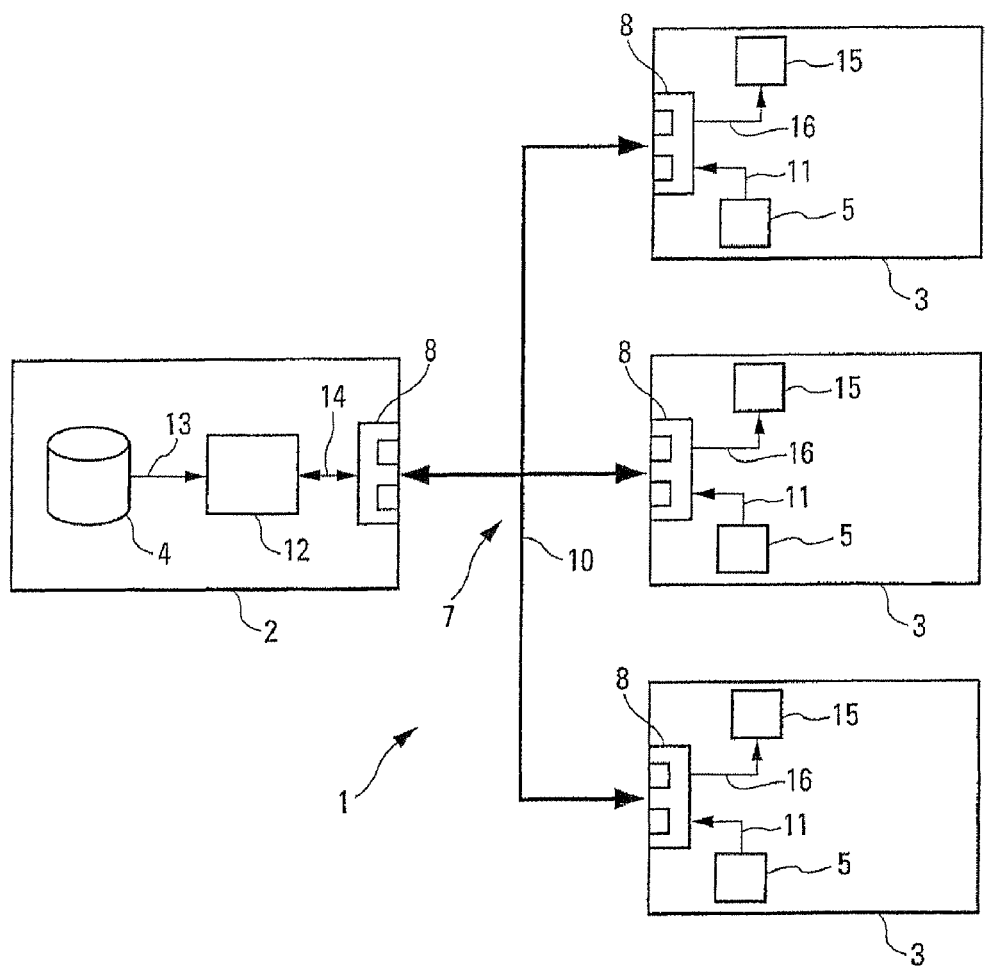

The device 1 according to the invention and represented in a basic embodiment in FIG. 1 is intended to transmit geographical data between at least one provider system 2 and at least one user system 3, that are both on board an aircraft, in particular a transport airplane.

Said provider system 2 is a system that comprises a database 4 containing geographical data and that is therefore able to provide such geographical data. The term "geographical data" should be understood to mean information relating to elements that are situated on the surface of the terrestrial globe, information that is likely to be used in a flight of an aircraft. As standard, this database 4 can either be incorporated directly in said provider system 2 or be linked to this provider system 2 by standard link means. As an illustration, this provider system 2 can be:
- an airport navigation system of OANS (Onboard Airport Navigation System) type, the database of which contains at least airport mapping information;
- an environment surveillance system of AESS (Aircraft Environment Surveillance System) type, the database of which contains at least information relating to the relief of the terrain; or
- a flight management system of FMS (Flight Management System) type, the database of which contains at least navigation data.

Said user system 3 is a system that uses geographical data to implement at least some of its functions. An example of a user system 3 might also be a flight management system of FMS type, an airport navigation system of OANS' type and an environment surveillance system of AESS type.

Said device 1 for transmitting geographical data is on board the aircraft and comprises at least one provider system 2 and at least one user system 3.

Furthermore, according to the invention, said provider system 2 comprises at least one database 4, in which said geographical data are stored in an ordered manner using a classification by unitary areas, and within each unitary area, a subclassification by groups. According to the invention, the unitary areas are geographical areas that are separate (that is to say that they have no common element) and the combination of which covers an overall geographical area (relating to all of said geographical data and corresponding to at least a portion of the terrestrial globe, and generally to all of the terrestrial globe). Furthermore, each of said groups comprises the geographical data relating to at least one particular characteristic likely to be used in a flight of the aircraft, and said groups are formed so that all of said geographical data are taken into account.

Furthermore, according to the invention:
said user system 3 comprises:
- means 5 that are capable of sending a request in order to obtain geographical data. These means 5 can be either automatic means that automatically make a request for geographical data, or actuation means that enable an operator, notably the pilot of the aircraft, to formulate a request for geographical data. According to the invention, said means 5 generate a request that makes it possible to identify at least one unitary area as mentioned above and that also makes it possible, for each unitary area that is likely to be identified by this request, to identify also at least one group (which, in the context of the present invention and as indicated previously, relates to a particular characteristic likely to be used in a flight of the aircraft); and
- sending means 6 that make it possible to send the request generated by said means 5;

the device 1 also comprises a data transmission system 7. The latter comprises a first sending/receiving device 8 that is installed on the user system 2, that comprises sending means 6 and receiving means 9, and that cooperate with a second similar sending/receiving device 8 that is mounted on said user system 3, to which it is linked via a standard data transmission link 10; and said provider system 2 also comprises means 12 that are linked via links 13 and 14 respectively to said database 4 and to said sending/receiving device 8 that are formed in such a way as to search for the geographical data that are located in the various groups that have been identified using a request (sent by the means 5 of the user system 3 and transmitted to said means 12 via a link 11, the device 8 of the user system 3, the data transmission link 10, the device 8 of the provider system 2 and the link 14).

Said means 12 search in the database 4 (and extract from the latter) all of the groups identified in the received request, and do so for all the unitary areas also identified in this request. The geographical data extracted in this way from the database 4 are then transmitted to user means 15 of the user system 3 (via said link 14, said device 8 of the user system 2, said data transmission link 10, said device 8 of the user system 3 and a link 16).

Said data transmission link 10 which is, for example, of ARINC 429 type or of AFDX type, is therefore capable:
- of transmitting a request from the user system 3 to the provider system 2; and
- of transmitting geographical data from said provider system to said user system 3.

Thus, thanks to the device 1 according to the invention, the transmission of the geographical data between a provider system 2 and a user system 3 is carried out by unitary area (or area unit) that represents a portion of the terrestrial globe. Such a transmission makes it possible to better manage the processing of geographical data by the user system 3, whether for the display (synchronization, partial display, etc.) or for any other use, as specified hereinbelow.

The device 1 according to the invention uses the fact that the geographical data requirements for the systems on board the aircraft generally relate to one and the same region of the globe, namely an area dependent on the flight, that is generally formed by the following two areas:
- the immediate vicinity of the aircraft within a given radius; and
- a specified area surrounding the planned flight plan.

Furthermore, the device 1 for transmitting geographical data according to the invention makes it possible to optimize the flow of data exchanges on board, by reducing the quantity of data exchanged. In practice, the systems 2, 3 exchange only the unitary areas that are strictly necessary to them. This optimizes the response time which results from this exchange, the quantity of data exchanged being close to the quantity of data needed according to the size selected for each area unit. This protocol comes into its own in the case of exchanges of large volumes of data.

To implement a data transmission according to the invention, a user system 3 asks for a particular number of unitary areas and it specifies the groups (that it requests for these unitary areas). As indicated hereinabove, each group comprises the geographical data relating to at least one particular characteristic that is likely to be used in a flight, and in particular waypoints, radio navigation beacons, the profile of the terrain and/or weather information.

Furthermore, the device 1 according to the invention has improved capacities for change. The syntax of the language is in fact the same for all the user systems 3 of the device 1. Also, from the moment when a new user system observes this language, it improves the exchange of the geographical data that it needs, with the other existing systems, with little impact:

there are no or few changes to be made to the existing provider system; and there is no new protocol to be developed.

Since the language is common, it is possible for the user system 3 to accurately measure the quantity of data received relative to the quantity of data requested. The decision whether or not to process these received data before the end of the transfer is therefore made on clear bases, and according to a language that is shared with the provider system 2.

In a particular embodiment, each unitary area is a substantially rectangular area, a first side of which has a length corresponding to a predetermined latitude value, for example one degree of latitude, and a second side of which (adjacent to this first side) has a length corresponding to a predetermined longitudinal value, for example one degree of longitude.

Furthermore, as a variant, said overall geographical area can also be subdivided into unitary areas, according to at least one of the following sets of characteristics:

state boundaries;

time zones;

air traffic control areas (FIR).

It will be noted that, in the context of the present invention, it is possible:

for all the unitary areas not to have the same area; and/or for all the unitary areas not to have the same density in terms of geographical data.

In a particular embodiment represented in FIG. 2, one and the same system 2, 3 of the aircraft can in succession be a provider system (when it provides geographical data that are stored in its database 4) and a user system (when it uses the means 5 to ask another system for the geographical data that it needs).

Moreover, in a preferred embodiment represented in FIG. 3, said provider system 2 is a standard database server, to which are linked a plurality of user systems 3 of the aircraft.

With such a database server, it is possible to centralize in the database 4 of this server most, or at least a large portion, of the geographical data necessary to the different user systems 3 on board the aircraft. This makes it possible to facilitate the transmission of geographical data and reduce the bulk.

The device 1 according to the invention can be applied to all types of transmission of geographical data on an aircraft. Possible different examples of geographical data transmission are described hereinbelow.

In a first example, the transmission of geographical data, implemented by the device 1, can relate to a set of unitary areas making it possible to cover a corridor of predetermined width along the flight plan of the aircraft. This transmission can, notably, be used to provide information to a flight management system of FMS type. In this case, in a preferred variant embodiment making it possible to optimize the transmission of data, said unitary areas are transmitted, in succession, according to their geographical position along the flight plan, in the direction corresponding to the flight of the aircraft following this flight plan.

This first example of transmission is illustrated by a straight line flight from London to Sydney (flight plan EGLL/YSSY). An upper limit on the number of unitary areas of 1 degree of longitude by 1 degree of latitude, traveled by a circle with a radius of 320 NM (nautical miles) around the aircraft, is:

(Sydney longitude London longitude)×width in latitude equivalent to 320 NM=151×11=1661 unitary areas.

Thus, when the flight plan EGLL/YSSY is entered into a flight management system of FMS type, said FMS system asks for the groups that it needs in the unitary areas covering the flight plan within a corridor of 320 NM (approximately 600 km) either side of the trajectory, or the 1661 unitary areas calculated previously.

It will be noted that with the following characteristics (1 degree of longitude by 1 degree of latitude), the surface area of the terrestrial globe is equivalent to 64 800 unitary areas. Consequently, the set of unitary areas (1661) involved in the above-mentioned flight represents only approximately only one fortieth of the overall area of the globe. This obviously makes it possible to considerably reduce the quantity of geographical data to be transmitted.

In a second example, the transmission of geographical data implemented by the device 1 can relate to an area of predetermined size that is situated around the current position of the aircraft, for example within a radius of 320 NM (approximately 600 km) around the aircraft. This transmission can, in particular, be used by an environment surveillance system of AESS type, for which the transmitted geographical data relate only to the group relating to the profile of the terrain (for the requested unitary areas). In this example, by taking into account the abovementioned characteristics (1° of longitude by 1° of latitude), an area is obtained around the aircraft comprising 121 unitary areas. To optimize the availability of the display, the surveillance system AESS can request as a priority the unitary areas that are located nearest around the aircraft.

Moreover, in a third example, the transmission of geographical data implemented by the device 1 can relate to airports likely to be involved in a flight of the aircraft, in particular the departure airport, the arrival airport and, possibly (at least) one potential diversion airport. This transmission can, notably, be used by an airport navigation system of OANS type.

The device 1 for transmitting geographical data according to the invention also offers the following benefits:

the user systems 3 can first ask for the unitary areas that it needs most urgently;

the exchange mode is simple, and therefore easy to use for a new user system;

the structure in classes (unitary areas) and in subclasses (groups) of the database 4 is extremely open-ended. The number of unitary areas does not change. On the other hand, the number of subclasses (or groups) can change, but in a manner bounded by the unitary area. It is possible for example to assume that, within a given unitary area, there will not be more than a predetermined number of airports. This enables the user system 3 to limit the time taken by the response to a request for geographical data, by unitary area; and the information exchange protocol, according to the invention, can withstand the loss of a data server function in the embodiment of FIG. 3. In practice, the user systems 3 store in a local memory the geographical data that they need during the flight are stored in a local memory so that, upon a loss of the data server, the functions currently being executed in these user systems 3 are not disturbed.

The invention claimed is:

1. A method of transmitting geographical data between a single provider system (2) and at least one user system (3) that are on board an aircraft, characterized in that:

A/in a preliminary step:
  an overall geographical area relating to all of said geographical data and corresponding to at least a part of the globe is subdivided into a plurality of unitary areas, that are separate, distinct geographical areas, the combination of which covers all of said overall geographical area;
  for each of said unitary areas, the geographical data relating to the unitary area is grouped together into a plurality of different groups, each of which comprises the geographical data relating to at least one particular characteristic likely to be used in a flight of the aircraft, said groups being formed such that all of said geographical data are taken into account; and
  said geographical data are stored in an ordered manner in a single database (4) of said provider system (2), by creating a classification wherein each unitary area of said plurality of unitary areas is further subclassified by groups, each group comprising the corresponding geographical data within the boundaries of the unitary area; and B/in a subsequent step:
  a) when the user system (3) wants to obtain particular geographical data, it sends a single request, using a single protocol associated with said provider system (2), via a data transmission link (10) to said provider system (2), said request making it possible to identify at least one unitary area and also making it possible, for each identified unitary area, to identify at least one group, wherein said single protocol is used for all requests for geographical data sent to said provider system (2);
  b) when such a request is received by said provider system (2), the latter searches in said database (4) for the geographical data that are located in all of the groups identified in the request, and this is done for all of the unitary areas also identified in this request; and
  c) said provider system (2) transmits said geographical information, for each identified unitary area, and for each identified group per unitary area, to said user system (3) via said data transmission link (10).

2. The method as claimed in claim 1, characterized in that each unitary area is a substantially rectangular area, a first side of which has a length corresponding to a predetermined latitude value and of which a second side adjacent to this first side has a length corresponding to a predetermined longitude value.

3. The method as claimed in claim 1, characterized in that said overall geographical area is subdivided into unitary areas, according to at least one of the following sets of characteristics:
  state boundaries;
  time zones;
  air traffic control areas.

4. The method as claimed in any one of claims 1 to 3, characterized in that the transmission of geographical data relates to a set of unitary areas making it possible to cover a corridor of predetermined width along a flight plan.

5. The method as claimed in claim 4, characterized in that said unitary areas are transmitted, in succession, according to their geographical position along the flight plan, in the direction corresponding to the flight of the aircraft following this flight plan.

6. The method as claimed in any one of claims 1 to 3, characterized in that the transmission of geographical data relates to an area of predetermined size that is situated around the current position of the aircraft.

7. The method as claimed in any one of claims 1 to 3, characterized in that the transmission of geographical data relates to airports likely to be involved in a flight of the aircraft.

8. A device for transmitting geographical data between a single provider system (2) and at least one user system (3) that are on board an aircraft, said device (1) comprising said provider system (2) and said user system (3), characterized in that:
  said provider system (2) comprises a single database (4), in which said geographical data are stored in an ordered fashion using at least one classification by unitary areas and, within each unitary area, a subclassification by groups, said unitary areas being geographical areas that are separate and distinct, the combination of which covers an overall geographical area relating to all of said geographical data and corresponding to at least a part of the globe, each of said groups comprising the geographical data relating to at least one particular characteristic likely to be used in a flight of the aircraft, and said groups being formed such that all of said geographical data within the boundaries of the unitary area are taken into account;
  said user system (3) comprises means (5) capable of sending a request in order to obtain geographical data, said request making it possible to identify at least one of said unitary areas and also making it possible, for each identified unitary area, to identify at least one of said groups;
  said provider system (2) also comprises:
    means (12) for searching in the database (4) for the geographical data that are located in all of the unitary areas identified in a received request, corresponding to all of the groups also identified in this request; and
    means (8) for sending said geographical data, per identified unitary area, and for each identified group per unitary area; and
  said device (1) also comprises at least one data transmission link (10), that is capable of transmitting a plurality of requests, using a protocol associated with the provider system (2), each one of said plurality of requests using the same protocol, from the user system (3) to the provider system (2), and that is capable of transmitting geographical data from the provider system (2) to the user system (3).

9. The device as claimed in claim 8, characterized in that said provider system (2) is a database server.

10. An aircraft, characterized in that it comprises a device (1) such as that specified under one of claims 8 and 9.

* * * * *